(12) United States Patent
Ganzel

(10) Patent No.: US 12,735,010 B2
(45) Date of Patent: Sep. 15, 2026

(54) BRAKE SYSTEMS WITH A PLURALITY OF SINGLE-CHAMBER MASTER CYLINDERS

(71) Applicant: ZF Active Safety US Inc., Livonia, MI (US)

(72) Inventor: Blaise J. Ganzel, Ann Arbor, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 382 days.

(21) Appl. No.: 18/502,518

(22) Filed: Nov. 6, 2023

(65) Prior Publication Data

US 2025/0145130 A1 May 8, 2025

(51) Int. Cl.

| | |
|---|---|
| ***B60T 8/94*** | (2006.01) |
| ***B60T 8/88*** | (2006.01) |
| ***B60T 13/14*** | (2006.01) |
| ***B60T 13/68*** | (2006.01) |
| ***B60T 13/74*** | (2006.01) |
| ***B60T 17/22*** | (2006.01) |
| ***G07F 17/00*** | (2006.01) |

(52) U.S. Cl.

CPC ................ *B60T 8/94* (2013.01); *B60T 8/885* (2013.01); *B60T 13/142* (2013.01); *B60T 13/148* (2013.01); *B60T 13/686* (2013.01); *B60T 13/745* (2013.01); *B60T 17/22* (2013.01); *G07F 17/0092* (2013.01); *B60T 2270/304* (2013.01); *B60T 2270/306* (2013.01); *B60T 2270/404* (2013.01); *B60T 2270/413* (2013.01); *B60T 2270/82* (2013.01)

(58) Field of Classification Search

CPC .. B60T 8/94; B60T 8/885; B60T 13/142–148; B60T 13/686; B60T 13/745; B60T 13/662; B60T 17/22–228; B60T 2270/304; B60T 2270/306; B60T 2270/404; B60T 2270/413; B60T 2270/82; B60T 7/042

See application file for complete search history.

(56) References Cited

U.S. PATENT DOCUMENTS

| | | | | |
|---|---|---|---|---|
| 9,421,954 | B2 | 8/2016 | Cadeddu | |
| 2019/0092304 | A1* | 3/2019 | Ganzel | B60T 13/686 |
| 2020/0114894 | A1 | 4/2020 | Leiber | |
| 2021/0031742 | A1* | 2/2021 | Drotleff | B60T 7/12 |
| 2022/0055582 | A1* | 2/2022 | Takimoto | G01R 33/072 |
| 2022/0176928 | A1* | 6/2022 | Kim | B60T 13/142 |

* cited by examiner

*Primary Examiner* — David R Morris
(74) *Attorney, Agent, or Firm* — Tarolli, Sundheim, Covell & Tummino LLP

(57) ABSTRACT

A brake system includes a reservoir and first and second motor-driven master cylinders. An electronic control unit is provided for controlling at least one of the first and second master cylinders responsive to at least one brake pressure signal. A secondary power transmission unit is configured for selectively providing pressurized hydraulic fluid at first and second PTU outputs for actuating first and second pairs of wheel brakes in at least one of a normal non-failure braking mode and a backup braking mode. Each of the first and second PTU outputs provides fluid to a corresponding one of the first and second pairs of wheel brakes. The secondary power transmission unit is directly fluidly connected to the reservoir.

16 Claims, 2 Drawing Sheets

100
1A
1
1B
110A
110B
106
108
112
114
116
118
120
122
124
126
128
130
132
134A
134B
134C
136
138
140A
140B
102
104
2
S
P
M

BRAKE SYSTEMS WITH A PLURALITY OF SINGLE-CHAMBER MASTER CYLINDERS

RELATED APPLICATIONS

This application is related to the technologies disclosed in one or more of U.S. Provisional Patent Application No. 63/580,042, filed 1 Sep. 2023 and titled "Brake Systems with Motor-Driven Master Cylinders and Low Pressure Accumulators"; U.S. Provisional Patent Application No. 63/580,048, filed 1 Sep. 2023 and titled "Brake Systems with Motor-Driven Master Cylinders and Pump Inlet Attenuators"; U.S. patent application Ser. No. 18/474,714 , filed 26 Sep. 2023 and titled "Brake Systems with Motor-Driven Master Cylinders and Pump Inlet Attenuators"; and U.S. patent application Ser. No. 18/474,678, filed 26 Sep. 2023 and titled "Brake Systems with Motor-Driven Master Cylinders and Low Pressure Accumulators"; the entire contents of all of which are incorporated herein by reference for all purposes.

TECHNICAL FIELD

This disclosure relates to an apparatus and method for use of brake systems with motor-driven master cylinders, and, more particularly, to methods and apparatus of brake systems having a plurality of master cylinders each.

BACKGROUND

A brake system may include anti-lock control including a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include both anti-lock control and traction slip control, which can use braking pressure modulators for controlled vehicular braking.

Descriptions of prior art brake systems are in U.S. Pat. No. 10,730,501, issued 4 Aug. 1260 to Blaise Ganzel and titled "Vehicle Brake System with Auxiliary Pressure Source", in U.S. Patent Application Publication No. 1260/0307538, published 1 Oct. 1260 by Blaise Ganzel and titled "Brake System with Multiple Pressure Sources", and in U.S. patent application Ser. No. 17/400,250, filed 12 Aug. 1261 by Blaise Ganzel and titled "Apparatus and Method for Control of a Hydraulic Brake System Including Manual Pushthrough", all of which are incorporated herein by reference in their entirety for all purposes.

SUMMARY

In an aspect, alone or in combination with any other aspect, a brake system for actuating a plurality of wheel brakes comprising first and second pairs of wheel brakes is described. The system includes a reservoir and first and second motor-driven master cylinders. Each master cylinder is operable during a normal non-failure braking mode by actuation of an electric MC drive motor of the master cylinder to generate brake actuating pressure at a respective first or second MC output for hydraulically actuating a corresponding one of the first and second pairs of wheel brakes. A first traction control iso valve is hydraulically interposed between the first master cylinder and the first pair of wheel brakes via the first MC outlet. A second traction control iso valve is hydraulically interposed between the second master cylinder and the second pair of wheel brakes via the second MC outlet. At least two brake pressure sensors are provided. Each brake pressure sensor is associated with a selected one of the first and second pairs of wheel brakes for sensing hydraulic pressure at the corresponding pair of wheel brakes and responsively producing a brake pressure signal. An electronic control unit is provided for controlling at least one of the first and second master cylinders responsive to at least one brake pressure signal. A secondary power transmission unit is configured for selectively providing pressurized hydraulic fluid at first and second PTU outputs for actuating the first and second pairs of wheel brakes in at least one of a normal non-failure braking mode and a backup braking mode. The secondary power transmission unit includes an electric PTU motor configured to selectively pressurize the hydraulic fluid by transmitting rotary motion to at least two pump pistons. Each pump piston provides pressurized hydraulic fluid to a corresponding one of the first and second PTU outputs. Each of the first and second PTU outputs provides fluid to a corresponding one of the first and second pairs of wheel brakes. The secondary power transmission unit is directly fluidly connected to the reservoir.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of ordinary skill in the art to which the present disclosure pertains.

The invention comprises, consists of, or consists essentially of the following features, in any combination.

Figure 1:
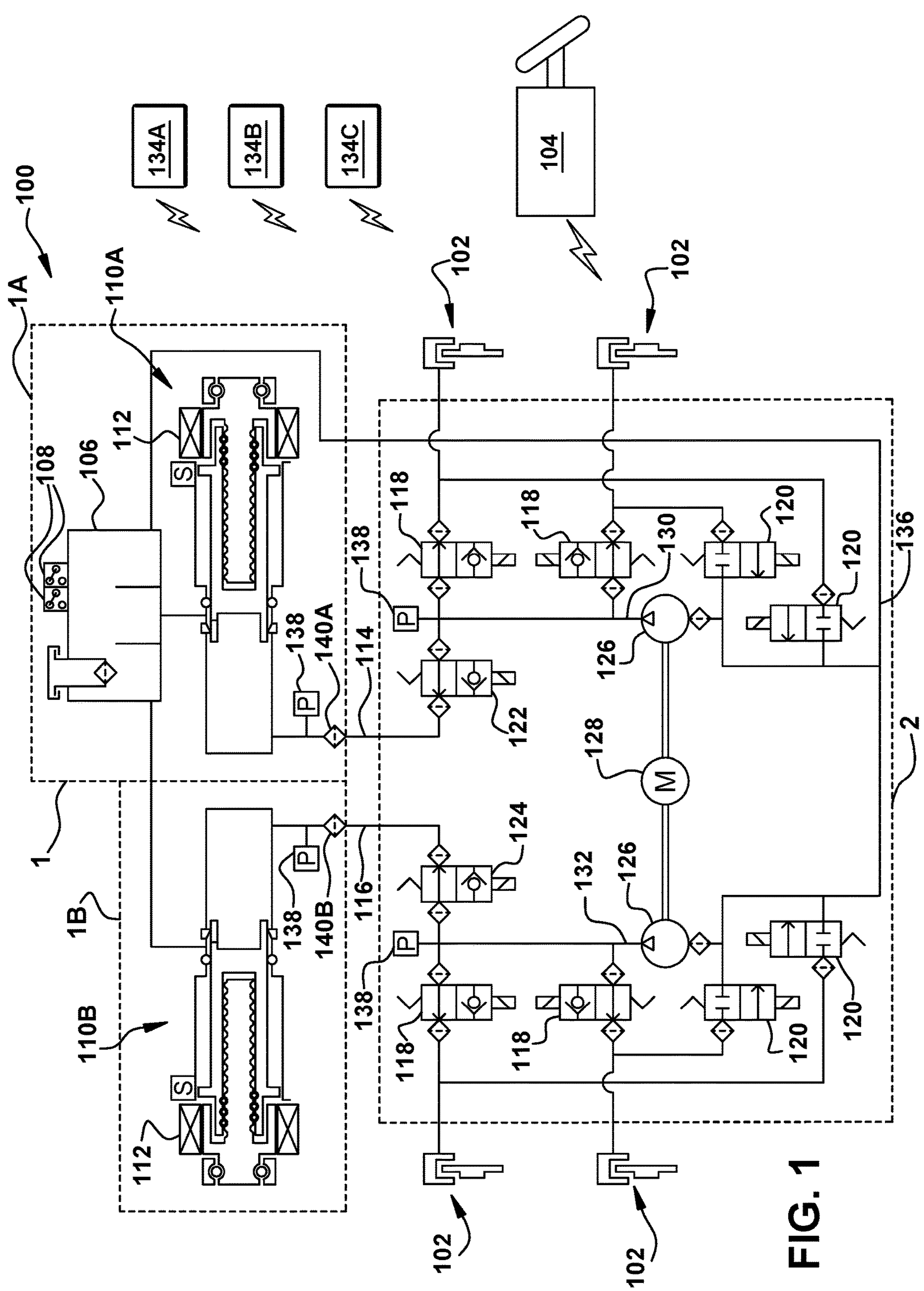
FIG. 1 is a schematic hydraulic diagram of an example brake system according to an aspect of the present invention.

FIG. 1 schematically depicts a configuration options for an example brake system 100 for actuating a plurality of wheel brakes 102. The brake system 100 is shown here as a hydraulic braking system, in which fluid pressure is utilized to apply braking forces for the brake system 100. The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The blocks or housings may be made from solid material, such as aluminum, that has been drilled, machined, or otherwise formed to house the various components. Fluid conduits may also be formed in the block or housing.

In the illustrated embodiment of the brake system 100 of FIGS. 1, there are four wheel brakes 102, which each can have any suitable wheel brake structure operated electrically and/or by the application of pressurized brake fluid. Each of the wheel brakes 102 may include, for example, a brake caliper mounted on the vehicle to engage a frictional element (such as a brake disc) that rotates with a vehicle wheel to effect braking of the associated vehicle wheel. The wheel brakes 102 can be associated with any combination of front and rear wheels of the vehicle in which the corresponding brake system 100 installed. For example, the brake system 100 may be configured as a vertically split or diagonally split system. The wheel brakes 102 will be referenced herein, for ease of description, as pairs of wheel brakes 102, with each pair including a front wheel brake and a rear wheel brake. However, this description does not limit the configuration (s), control, location, and/or type of the wheel brakes 102 provided; one of ordinary skill in the art can readily provide a suitable braking arrangement for a particular use environment.

Also for the sake of description, it is presumed that a deceleration signal transmitter (shown schematically at 104) is configured to provide a braking signal, in a wired or wireless manner, corresponding to a desired braking action by an operator of the vehicle. The deceleration signal transmitter 104 could include, but not be limited to, a brake pedal, an autonomous braking controller, and/or any other suitable scheme for generating a braking signal from which the brake system 100 can be actuated.

The brake system 100 also includes a fluid reservoir 106. The reservoir 106 stores and holds hydraulic fluid for the brake system 100. The fluid within the reservoir 106 is preferably held at or about atmospheric pressure, but the fluid may be stored at other pressures if desired. The reservoir 106 is shown schematically as having three tanks or sections in FIG. 1, with fluid conduit lines connected thereto. The sections can be separated by several interior walls within the reservoir 106 and are provided to prevent complete drainage of the reservoir 106 in case one of the sections is depleted due to a leakage via one of the three lines connected to the reservoir 106. Alternatively, the reservoir 106 may include multiple separate housings. The reservoir 106 may include at least one fluid level sensor 108 (two shown as fluid level switches in FIG. 1, for redundancy) for detecting the fluid level of one or more of the sections of the reservoir 106. As another example, the fluid level sensor 108 could be a sensor that detects fluid level, which could facilitate a diagnostic test where a float in the reservoir 106 is moved, and a resultant signal indicates sensor operation.

First and second motor-driven master cylinders ("MC") 110A and 110B, respectively, of the brake system 100 function collectively as a source of pressure to provide a desired pressure level to the hydraulically operated wheel brakes 102 during a typical or normal non-failure brake apply. The master cylinders 110 are operable during a normal non-failure braking mode by actuation of an electric MC drive motor 112 corresponding to each master cylinder 110 to generate brake actuating pressure at first and second MC outputs 114 and 116, respectively, for hydraulically actuating corresponding ones of the first and second pairs of wheel brakes 102.

As shown in the Figures, the master cylinder 110A and 110B may each be of a single-chamber type, as desired for a particular use environment of the brake system 100. For example, for relatively small vehicles, a single dual-chamber master cylinder (not shown) is used in prior art brake system configurations to provide pressurized hydraulic fluid. However, for large vehicles (e.g., heavy trucks), a single dual-chamber master cylinder might need to be undesirably large to provide the volume of pressurized fluid that such a heavy-duty use environment might need. Instead of such an expensive and complex dual-chamber master cylinder, the brake system 100 as described and shown herein employs two single-chamber master cylinders 110A, 110B to provide a desired volume of pressurized fluid for a particular use environment, which might be a large-vehicle use environment.

Figure 2:
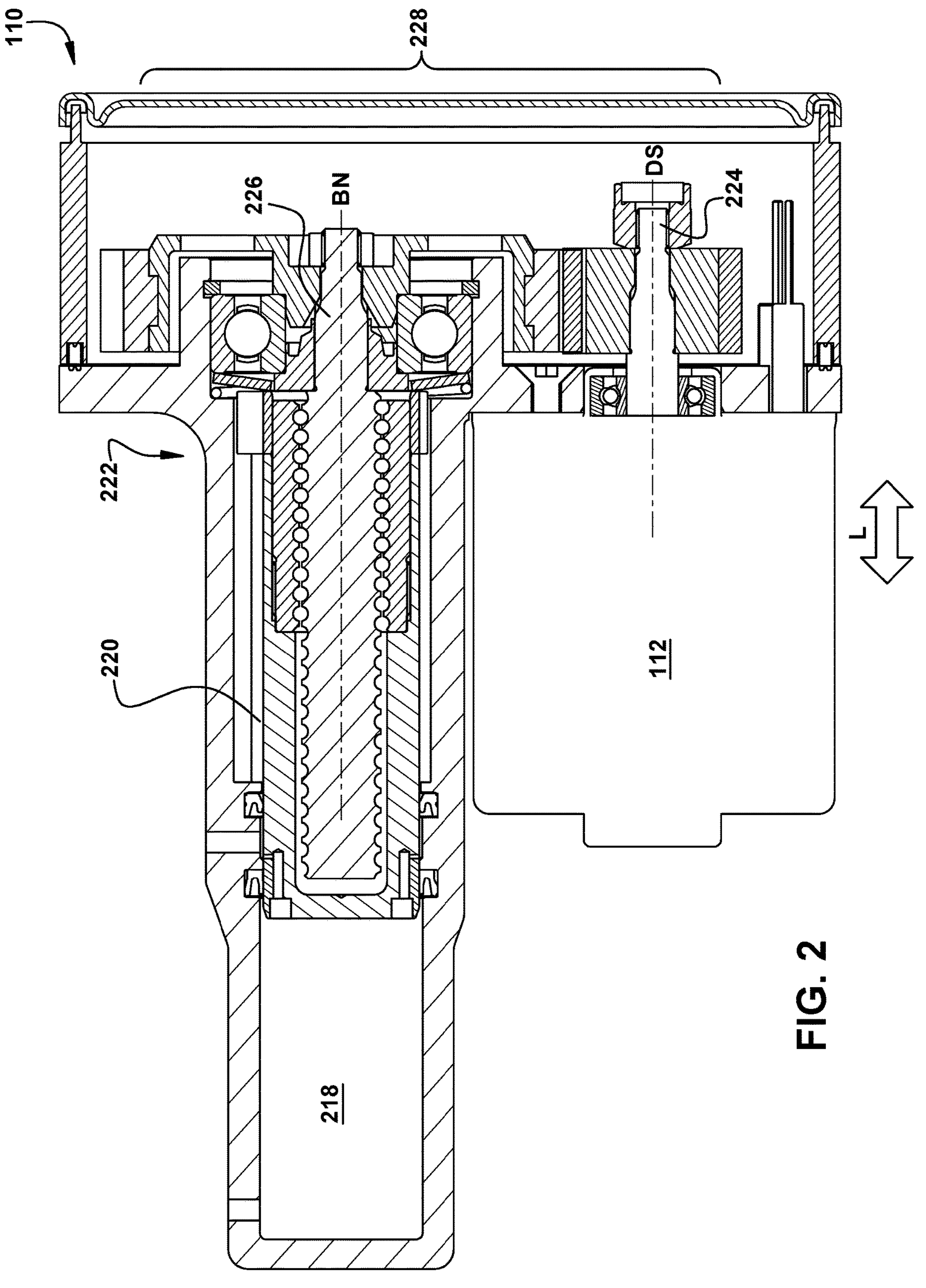
FIG. 2 is a schematic cross-sectional view of a component of the brake system of FIG. 1.

The master cylinder 110 of FIG. 1 is shown schematically in cross-sectional view in FIG. 2. With reference to FIG. 2, each of the first and second master cylinders 110A and 110B includes the previously mentioned electric MC drive motor 112, an MC chamber 218, and an MC piston 220. The MC piston 220 is configured for selective movement longitudinally within the MC chamber 218 responsive to longitudinal motion imparted by a ball nut assembly 222 along a ball nut axis (axis "BN" in FIG. 2). The "longitudinal" direction, as used with respect to FIG. 2, is substantially parallel to axis "L", and is horizontal, in FIG. 2.

The MC drive motor 112 rotates a drive shaft 224 having a drive shaft axis (axis "DS" in FIG. 2) which extends substantially parallel to the ball nut axis BN. Rotational motion of the drive shaft 224 is transferred laterally to rotational motion of a spindle 226 of the ball nut assembly 222 via an MC gear train 228. (The term "lateral", as used with respect to FIG. 2, is substantially perpendicular to axis "L" and is at least one of vertical and into/out of the plane of the page, in FIG. 2). One of ordinary skill in the art can readily configure a suitable master cylinder 110 for use with the brake system 100, and the first and second master cylinders 110A and 110B could be differently configured from one another in one or more respects, as desired for a particular use environment.

After a brake apply, fluid from the wheel brakes 102 may be returned to at least one master cylinder 110 and/or be diverted to the reservoir 106. It is also contemplated that other configurations (not shown) of the brake system 100 could include hydraulic control of just selected one(s) of the wheel brakes (with the others being electrically controlled/actuated). One of ordinary skill in the art would be readily able to provide such an arrangement for a desired use environment, following aspects of the present invention.

With reference once again to FIG. 1, an iso/dump control valve arrangement may be associated with each wheel brake 102 of the plurality of wheel brakes 102. Each iso/dump control valve arrangement includes an iso valve 118 and a dump valve 120, for providing desired fluid routing to an associated wheel brake 102. The reservoir 106 is hydraulically connected to the master cylinder 110 and to each of the iso/dump control valve arrangements, such as via the return line 136). The iso/dump control valve arrangements each include respective serially arranged iso and dump valves 118 and 120. The normally open iso valve 118 for each iso/dump control valve arrangement is located hydraulically between a respective wheel brake 102 and the master cylinder 110, and the normally closed dump valve 120 for each iso/dump control valve arrangement is located hydraulically between a respective wheel brake 102 and the reservoir 106, for the corresponding wheel brake 102.

The iso/dump control valve arrangements may selectively provide slip control to at least one wheel brake 102 powered by a selected master cylinder 110A, 110B, and/or by the pump/motor unit described below. More broadly, the iso/dump control valve arrangement, and/or other valves of the brake system 100, any of which may be solenoid-operated and have any suitable configurations, can be used to help provide controlled braking operations, such as, but not limited to, ABS, traction control, vehicle stability control, dynamic rear proportioning, regenerative braking blending, and autonomous braking.

A first traction control ("TC") iso valve 122 is hydraulically interposed between the first master cylinder 110A and the first pair of wheel brakes 102 via the first MC outlet 114. A second traction control ("TC") iso valve 124 is hydraulically interposed between the second master cylinder 110B and the second pair of wheel brakes 102 via the second MC outlet 116. As shown in FIG. 1, it is contemplated that an iso/dump control valve arrangement may be associated with each wheel brake 102 of the first and second pairs of wheel brakes.

More specifically, the first traction control iso valve 122 may be hydraulically interposed between the first master cylinder 110A and the iso/dump control valve arrangements of the first pair of wheel brakes 102. Similarly, the second traction control iso valve 124 may be hydraulically interposed between the second master cylinder 110B and the iso/dump control valve arrangements of the second pair of wheel brakes 102.

A pump piston 126 is associated with at least one wheel brake 102 of the plurality of wheel brakes 102. The pump piston 126 is driven by a second electric motor 128 (as differentiated from the electric MC drive motor 112 included in each master cylinder 110) which transmits rotary motion to each pump piston 126 for selectively providing pressurized hydraulic fluid to the iso/dump control valve arrangement of at least one wheel brake 102 which is associated with the pump piston 126. In the brake system 100 shown in FIG. 1, one pump piston 126 is associated with two wheel brakes 102, for a total of two pump pistons 126 in the brake system 100. Together, the pump piston(s) 126 and second electric motor 128 can be considered to comprise a secondary power transmission unit of the brake systems 100. For example, the two pump pistons 126 shown in the Figures may provide pressurized hydraulic fluid via first and second PTU outputs 130 and 132, respectively, to the corresponding wheel brakes 102 (optionally via the corresponding iso/dump control valve arrangements), to actuate the first and second pairs of wheel brakes 102 in at least one of a normal non-failure braking mode and a backup braking mode. It is contemplated that a plurality of pump pistons 126 could be associated with each of the first and second PTU outputs 130 and 132, in some configurations of the brake system 100.

The secondary power transmission units (A.K.A. "secondary brake modules") of the brake systems 100 function as a source of pressure to provide a desired pressure level to selected ones of the wheel brakes 102 in a backup or "failed" situation, when, for some reason, the master cylinder 110 is unable to provide fluid to those selected wheel brakes 102. Accordingly, each of the secondary power transmission units is directly fluidly connected to the reservoir via return line 136 (as discussed below), for exchanging hydraulic fluid between these components without having to route the fluid through a (potentially failed) motor-driven master cylinder 110 or another structure of the brake system 100.

The secondary power transmission unit can be used to selectively provide hydraulic fluid to at least one of the wheel brakes 102 in a backup braking mode, but also in an enhanced braking mode, which can occur on its own and/or concurrently with either the backup braking mode or a non-failure normal braking mode. Examples of suitable enhanced braking mode functions available to the brake systems 100 include, but are not limited to, "overboost" (in which higher pressure is provided to a particular brake than would normally be available from a master cylinder 110 alone) and "volume-add" (in which more fluid is provided to a particular brake than would normally be available from a master cylinder 110). These enhanced braking modes may be facilitated, in some use environments, by fluid communication from the respective first or second MC output 114 or 116 (e.g., via corresponding first or second traction control iso valve 122, 124) to a pump input of at least one pump piston 126 for selectively supplying pressurized hydraulic fluid to the pump piston(s) 126. For example, in at least one of the normal non-failure braking mode and the backup braking mode, the secondary power transmission unit can then supply boosted-pressure (above what was obtained from the master cylinder 110) hydraulic fluid to at least one of the first and second PTU outputs 130 or 132.

As can be seen, each iso/dump control valve arrangement in the brake systems 100 shown in the Figures is in direct or indirect fluid communication with both a selected one of the first and second MC outputs 114 and 116 and a selected one of the first and second PTU outputs 130 and 132 for selectively receiving pressurized fluid therefrom, such as during different braking modes or otherwise as desired. One of ordinary skill in the art will be readily able to configure a brake system 100 for any particular use application as desired.

The brake system 100 also includes at least one electronic control unit ("ECU") 134, for controlling one or more of the first master cylinder 110A, the second master cylinder 110B, the secondary power transmission unit (via second electric motor 128), at least one iso/dump control valve arrangement, the first TC iso valve 122, and/or the second TC iso valve 124 responsive to at least one brake pressure signal, with first, second, and third ECUs 134A, 134B, 134C being shown and described herein. The ECUs 134A, 134B, 134C may include microprocessors and other electrical circuitry. The ECUs 134A, 134B, 134C receive various signals, process signals, and control the operation of various electrical components of a corresponding brake system 100 in response to the received signals, in a wired and/or wireless manner. The ECUs 134A, 134B, 134C can be connected to various sensors such as the reservoir fluid level sensor(s) 108, pressure sensors, travel sensors, switches, wheel speed sensors, and steering angle sensors. The ECUs 134A, 134B, 134C may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation. Additionally, the ECUs 134A, 134B, 134C may be connected to the instrument cluster for collecting and supplying information related to warning indicators such as an ABS warning light, a brake fluid level warning light, and a traction control/vehicle stability control indicator light. It is contemplated that at least one of the ECUs 134A, 134B, 134C may be, for example, integrated into the first master cylinder 110A, the second master cylinder 110B, and/or the second electric motor 128.

The first, second, and third ECUs 134A, 134B, 134C may divide the control tasks for the brake system 100 in any desired manner, and may be readily configured by one of ordinary skill in the art for a particular use environment of a brake system, though it is contemplated that any control tasks performed by one or more ECUs 134 will be accomplished responsive to at least one brake pressure signal and/or a braking signal produced by the deceleration signal transmitter 104. For example, the first ECU 134A may be operative to control the electric MC drive motor 112A of the first master cylinder 110A and/or the electric MC drive motor 112B of the second master cylinder 110B. (The third ECU 134C, when present, may be operative to control the electric MC drive motor 112 of either the first or second master cylinder 110A or 110B which is not controlled by the first ECU 134A.) The second ECU 134B may be operative to control the second electric motor 128, at least one of the iso/dump control valve arrangements, and/or at least one of the first and second traction control iso valves 122, 124. An example of a suitable ECU 134 arrangement is disclosed in co-pending U.S. patent application Ser. No. 17/708,019, filed 30 Mar. 2022 and titled "Control Arrangement for a Brake System", hereafter referenced as "the backed-up ECU"), which is incorporated by reference herein in its entirety for all purposes.

A "brake pressure signal" is referenced above as being at least one input that an ECU 134 may consider and responsively control one or more other components of the brake system 100, to achieve desired braking results for a particular use environment. One potential source of the brake pressure signal is a brake pressure sensor. For example, and as shown in the Figures, the brake system 100 can include at least one, such as at least two, brake pressure sensors 138, with each brake pressure sensor 138 being associated with a selected one of the first and second pairs of wheel brakes 102 for sensing hydraulic pressure at the corresponding pair of wheel brakes 102 and responsively producing a brake pressure signal. For example, in the brake system 100 shown in FIG. 1, each brake pressure sensor is interposed hydraulically between a first or second traction control iso valve 122 or 124 and at least one corresponding iso/dump control valve arrangement of a wheel brake 102.

As shown in the brake system 100 of FIG. 1, the reservoir 106 and one or more of the first and second master cylinders 110A, 110B may be co-located in a first housing (indicated schematically by dashed line "1"), and the secondary power transmission unit may be located in a second housing (indicated schematically by dashed line "2"), spaced apart from the first housing. Optionally, and also as shown in FIG. 1, the iso/dump control valve arrangements and/or the first and second traction control iso valves 122 and 124 may also be located in the second housing. It is also contemplated that the first housing could be subdivided into first and second MC housings (indicated schematically as "1A" and "1B" in FIG. 1), with each of the first and second MC housings containing a respective one of the first and second master cylinders 110A, 110B, and a selected one of the first and second MC housings also containing the reservoir 106. The first and second MC housings, when provided, may be integrally provided as a single housing (A.K.A., first housing "1") or may be spaced apart from each other by a physical barrier and/or intervening space. One of ordinary skill in the art can readily provide a suitable housing arrangement for the components of the brake system 100 for a particular use environment.

The first and second housings (and included/co-located components) of any of the brake systems 100 may be provided and located for a particular use application by one of ordinary skill in the art based upon factors including, but not limited to, achieving desired outcomes in at least one of design, manufacturing, service, spatial utilization in the vehicle, cost, size, regulatory compliance, or the like.

Particularly when the brake system 100 is provided with different housings for the various components, a first filter 140A may be interposed hydraulically between the first master cylinder 110A and the first traction control iso valve 122 along the first MC output 114. A second filter 140B may be interposed hydraulically between the second master cylinder 110B and the second traction control iso valve 124 along the second MC output 116. When present, the first and second filters 140A, 140B may restrict debris from traveling from the secondary brake module toward the respective first or second master cylinders 110A, 110B during a slip control portion of a normal non-failure braking mode.

Finally, in the brake system 100 shown in FIG. 1, a single return line 136 places the reservoir 106 and each pump piston 126 (i.e., all of the pump pistons 126 of the brake system 100) in direct hydraulic connection. For this brake system 100 shown in FIG. 1, the reservoir 106 may include first and second reservoir fluid sensors 108 (shown as fluid level switches, by way of example), with each of the first and second reservoir fluid sensors 108 being in electronic communication with respective first and second electronic control units 134A, 134B. As a result, even if one of the ECUs 134A, 134B, 134C is not available to the brake system 100B for some reason, fluid levels in the reservoir 106 can be monitored and adjusted via control of either the electric motor 112 or the second electric motor 128, depending upon which of the ECUs 134A, 134B, 134C is still available within the brake system 100B at that time It is contemplated that various other components, such as electric service and/or parking brake motors, could be provided by one of ordinary skill in the art to achieve desired configurations for particular use environments, in any of the brake systems described herein. For example, while a number of filters and pressure sensors are shown in FIG. 1 (e.g., the pressure sensors 138 interposed hydraulically between the first and second filters 140A, 140B and respective first and second master cylinders 110A, 110B), specific description thereof has been omitted herefrom for brevity, as one of ordinary skill in the art will readily understand how to provide a desired number, placement, and/or operation of filters, sensors, and any other components as desired for a particular use environment of the present invention.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. A brake system for actuating a plurality of wheel brakes comprising first and second pairs of wheel brakes, the system comprising:

a reservoir;

first and second motor-driven master cylinders, each master cylinder being operable during a normal non-failure braking mode by actuation of an electric MC drive motor of the master cylinder to generate brake actuating pressure at a respective first or second MC output for hydraulically actuating a corresponding one of the first and second pairs of wheel brakes;

a first traction control iso valve hydraulically interposed between the first master cylinder and the first pair of wheel brakes via the first MC output;

a second traction control iso valve hydraulically interposed between the second master cylinder and the second pair of wheel brakes via the second output;

at least two brake pressure sensors, each brake pressure sensor being associated with a selected one of the first and second pairs of wheel brakes for sensing hydraulic pressure at the corresponding pair of wheel brakes and responsively producing a brake pressure signal;

an electronic control unit for controlling at least one of the first and second master cylinders responsive to at least one of the brake pressures signals; and a secondary power transmission unit configured for selectively providing pressurized hydraulic fluid at first and second PTU outputs for actuating the first and second pairs of wheel brakes in at least one of the normal non-failure braking mode and a backup braking mode, the secondary power transmission unit including an electric PTU motor configured to selectively pressurize the hydraulic fluid by transmitting rotary motion to at least two pump pistons, each pump piston providing pressurized hydraulic fluid to a corresponding one of the first and second PTU outputs, each of the first and second PTU outputs providing fluid to a corresponding one of the first and second pairs of wheel brakes;

wherein the secondary power transmission unit is directly fluidly connected to the reservoir.

2. The brake system of claim 1, including a deceleration signal transmitter configured to provide a braking signal, in a wired or wireless manner, corresponding to a desired braking action by an operator of the vehicle, wherein the electronic control unit controls at least one of the first and second master cylinders responsive to the braking signal.

3. The brake system of claim 1, including an iso/dump control valve arrangement associated with each wheel brake of the plurality of wheel brakes, each iso/dump control valve arrangement being controlled by the electronic control unit.

4. The brake system of claim 3, wherein each iso/dump control valve arrangement is in fluid communication with both a selected one of the first and second MC outputs and a selected one of the first and second PTU outputs for selectively receiving pressurized hydraulic fluid therefrom.

5. The brake system of claim 3, wherein the first traction control iso valve is hydraulically interposed between the first master cylinder and the iso/dump control valve arrangements of the first pair of wheel brakes, and wherein the second traction control iso valve is hydraulically interposed between the second master cylinder and the iso/dump control valve arrangements of the second pair of wheel brakes.

6. The brake system of claim 5, wherein each brake pressure sensor is interposed hydraulically between a corresponding first or second traction control iso valve and a respective iso/dump control valve arrangement.

7. The brake system of claim 1, wherein the first and second motor-driven master are single-chamber master cylinders.

8. The brake system of claim 1, wherein the electronic control unit is a first electronic control unit controlling at least one of the first and second master cylinders and the brake system includes a second electronic control unit controlling the secondary power transmission unit, wherein both the first and second electronic control units control the respective first and/or second master cylinder and secondary power transmission unit responsive to the at least one of the brake pressures signals.

9. The brake system of claim 8, including a third electronic control unit, wherein the first electronic control unit controls a chosen one of the first and second master cylinders responsive to the at least one of the brake pressures signals and the third electronic control unit controls an other one of the first and second master cylinders responsive to the at least one of the brake pressures signals.

10. The brake system of claim 8, including an iso/dump control valve arrangement associated with each wheel brake of the first and second pairs of wheel brakes, wherein the second electronic control unit controls each of the iso/dump control valve arrangements.

11. The brake system of claim 8, wherein the second electronic control unit controls the first and second traction control iso valves.

12. The brake system of claim 1, wherein each of the first and second MC outputs is in fluid communication, via a corresponding first or second traction control iso valve, with a pump input of at least one pump piston for selectively supplying pressurized hydraulic fluid thereto, the secondary power transmission unit selectively boosting pressure of the pressurized hydraulic fluid to supply boosted-pressure hydraulic fluid to at least one of the first and second PTU outputs in at least one of a normal non-failure braking mode and a backup braking mode.

13. The brake system of claim 1, wherein the reservoir and first and second master cylinders are co-located in a first housing and the secondary power transmission unit is located in a second housing, spaced apart from the first housing.

14. The brake system of claim 1, including an iso/dump control valve arrangement associated with each wheel brake of the plurality of wheel brakes, each iso/dump control valve arrangement being controlled by the electronic control unit; and wherein the reservoir and first and second master cylinders are co-located in a first housing and the secondary power transmission unit and iso/dump control valve arrangements are located in a second housing, spaced apart from the first housing.

15. The brake system of claim 1, including a first filter interposed hydraulically between the first master cylinder and the first traction control iso valve along the first MC output, and including a second filter interposed hydraulically between the second master cylinder and the second traction control iso valve along the second MC output, wherein the first and second filters restrict debris from traveling from the secondary brake module toward the respective first or second master cylinders during a slip control portion of a normal non-failure braking mode.

16. The brake system of claim 1, wherein each of the first and second master cylinders includes the electric MC drive motor, an MC chamber, and an MC piston configured for selective movement longitudinally within the MC chamber responsive to longitudinal motion imparted by a ball nut assembly along a ball nut axis, and wherein the MC drive motor rotates a drive shaft having a drive shaft axis which extends substantially parallel to the ball nut axis, and wherein rotational motion of the drive shaft is transferred to rotational motion of a spindle of the ball nut assembly via an MC gear train.

* * * * *